US009049235B2

(12) United States Patent
Liebmann et al.

(10) Patent No.: US 9,049,235 B2
(45) Date of Patent: Jun. 2, 2015

(54) CLOUD EMAIL MESSAGE SCANNING WITH LOCAL POLICY APPLICATION IN A NETWORK ENVIRONMENT

(71) Applicant: McAfee Inc., Santa Clara, CA (US)

(72) Inventors: Nicholas Liebmann, Watford (GB); Peter Neal, Oxford (GB); Michael G. Bishop, Thame (GB); Justin Cragin, Aurora, CO (US); Michael Driscoll, Denver, CO (US)

(73) Assignee: McAfee, Inc., Santa Clara, CA (US)

( * ) Notice: Subject to any disclaimer, the term of this patent is extended or adjusted under 35 U.S.C. 154(b) by 10 days.

(21) Appl. No.: 13/683,976

(22) Filed: Nov. 21, 2012

(65) Prior Publication Data
US 2014/0020047 A1 Jan. 16, 2014

Related U.S. Application Data

(60) Provisional application No. 61/672,222, filed on Jul. 16, 2012.

(51) Int. Cl.
H04L 29/06 (2006.01)
G06F 21/00 (2013.01)
H04L 12/58 (2006.01)

(52) U.S. Cl.
CPC .............. H04L 63/20 (2013.01); H04L 12/585 (2013.01); H04L 63/0227 (2013.01); H04L 51/12 (2013.01)

(58) Field of Classification Search
None
See application file for complete search history.

(56) References Cited

U.S. PATENT DOCUMENTS

| 5,987,610 | A | 11/1999 | Franczek et al. | |
| 6,073,142 | A | 6/2000 | Geiger et al. | |
| 6,460,050 | B1 * | 10/2002 | Pace et al. ............................. | 1/1 |
| 7,506,155 | B1 | 3/2009 | Stewart et al. | |
| 7,756,929 | B1 * | 7/2010 | Pettigrew et al. ............. | 709/206 |

(Continued)

FOREIGN PATENT DOCUMENTS

WO 2014/014848 A1 1/2014

OTHER PUBLICATIONS

Rekhter, Y., Moskowitz, B., Karrenberg, D., de Groot, G., and E. Lear, "Address Allocation for Private Internets", BCP 5, RFC 1918, Feb. 1996, retrieved on Nov. 20, 2012 from http://tools.ietf.org/pdf/rfc1918.pdf, 10 pages.

(Continued)

Primary Examiner — Jung Kim
Assistant Examiner — Janusz Kusyk
(74) Attorney, Agent, or Firm — Patent Capital Group

(57) ABSTRACT

A method for applying policies to an email message includes receiving, by an inbound policy module in a protected network, message metadata of an email message. The method also includes determining, based on the message metadata, whether receiving the email message in the protected network is prohibited by at least one metadata policy. The method further includes blocking the email message from being forwarded to the protected network if receiving the email message in the protected network is prohibited by the metadata policy. In specific embodiments, the method includes requesting scan results data for the email message if receiving the email message in the protected network is not prohibited by one or more metadata policies. In further embodiments, the method includes receiving the scan results data and requesting the email message if receiving the email message in the protected network is not prohibited by one or more scan policies.

15 Claims, 7 Drawing Sheets

(56) References Cited

U.S. PATENT DOCUMENTS

| | | | |
|---|---|---|---|
| 7,882,193 | B1 | 2/2011 | Aronson et al. |
| 8,566,938 | B1* | 10/2013 | Prakash et al. .................. 726/22 |
| 2005/0081059 | A1* | 4/2005 | Bandini et al. ................ 713/201 |
| 2007/0071213 | A1* | 3/2007 | Claudatos et al. ....... 379/211.01 |
| 2008/0098237 | A1* | 4/2008 | Dung et al. .................. 713/189 |
| 2009/0055751 | A1* | 2/2009 | DePue et al. .................. 715/740 |
| 2011/0119729 | A1* | 5/2011 | Bergeson et al. ................. 726/1 |
| 2011/0167474 | A1 | 7/2011 | Sinha et al. |
| 2011/0289134 | A1 | 11/2011 | De Los Reyes et al. |
| 2011/0307950 | A1 | 12/2011 | Eikenberry et al. |
| 2012/0011361 | A1* | 1/2012 | Guerrero et al. ............. 713/168 |

OTHER PUBLICATIONS

Hinden, R. and B. Haberman, "Unique Local IPv6 Unicast Addresses", RFC 4193, Oct. 2005, retrieved on Nov. 20, 2012 from http://tools.ietf.org/pdf/rfc4193.pdf, 17 pages.

Klensin, J., "Simple Mail Transfer Protocol", RFC 5321, Oct. 2008, retrieved on Nov. 20, 2012 from http://tools.ietf.org/pdf/rfc5321.pdf, 96 pages.

"McAfee Email Gateway", McAfee, Inc., copyright 2012, retrieved on Nov. 20, 2012 from http://www.mcafee.com/us/resources/data-sheets/ds-email-gateway.pdf, 4 pages.

"McAfee Saas Email Protection and Continuity", McAfee, Inc., copyright 2012, retrieved on Nov. 20, 2012 from http://www.mcafee.com/us/resources/data-sheets/ds-saas-email-protection-and-continuity.pdf, 2 pages.

"Optimal Email Security", McAfee, Inc., copyright 2010, retrieved on Nov. 20, 2012 from http://www.mcafee.com/us/resources/solution-briefs/sb-optimal-email-security.pdf, 2 pages.

International Search Report and Written Opinion received for the PCT Patent Application No. PCT/US2013/050573, mailed on Oct. 25, 2013, 9 pages.

* cited by examiner

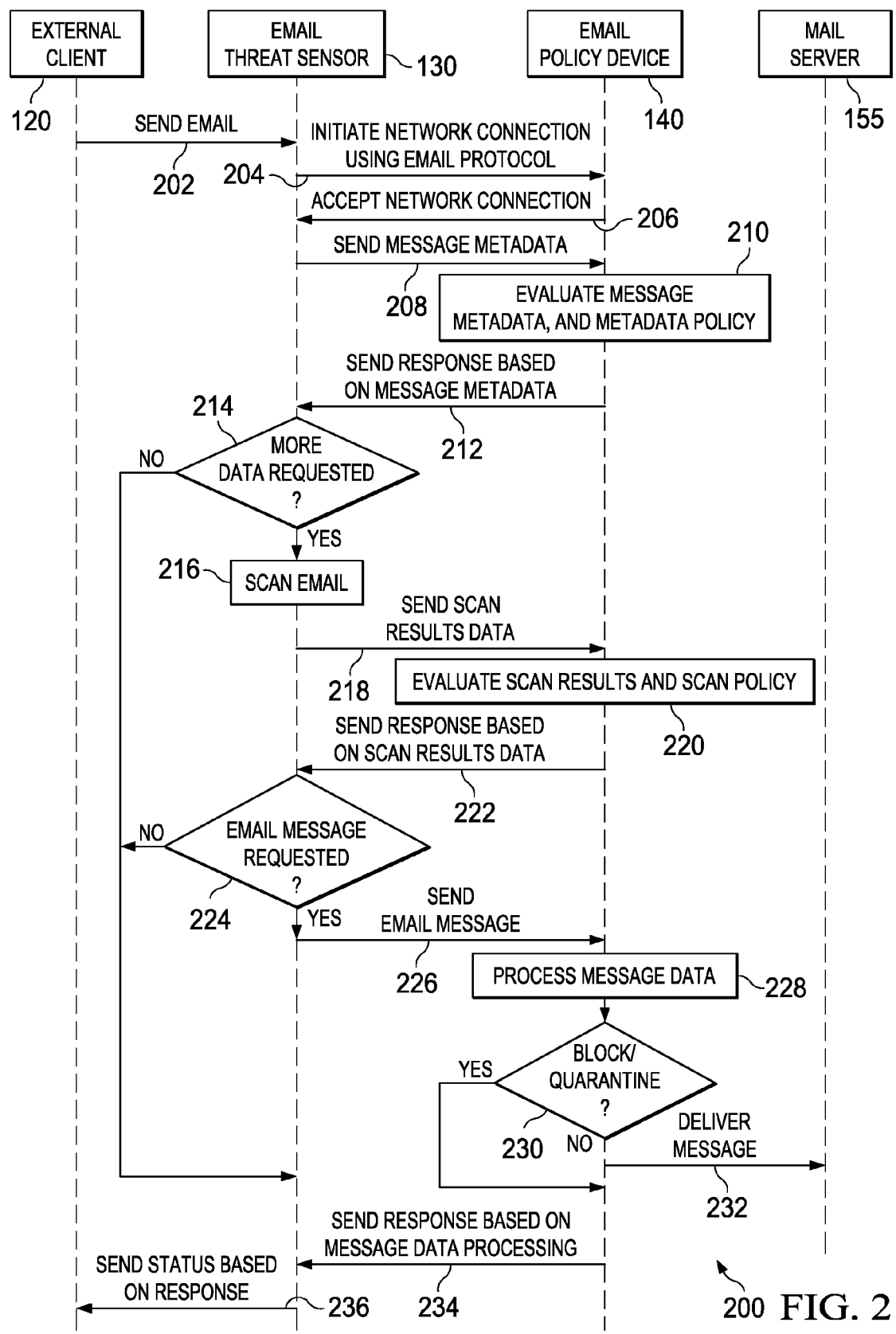

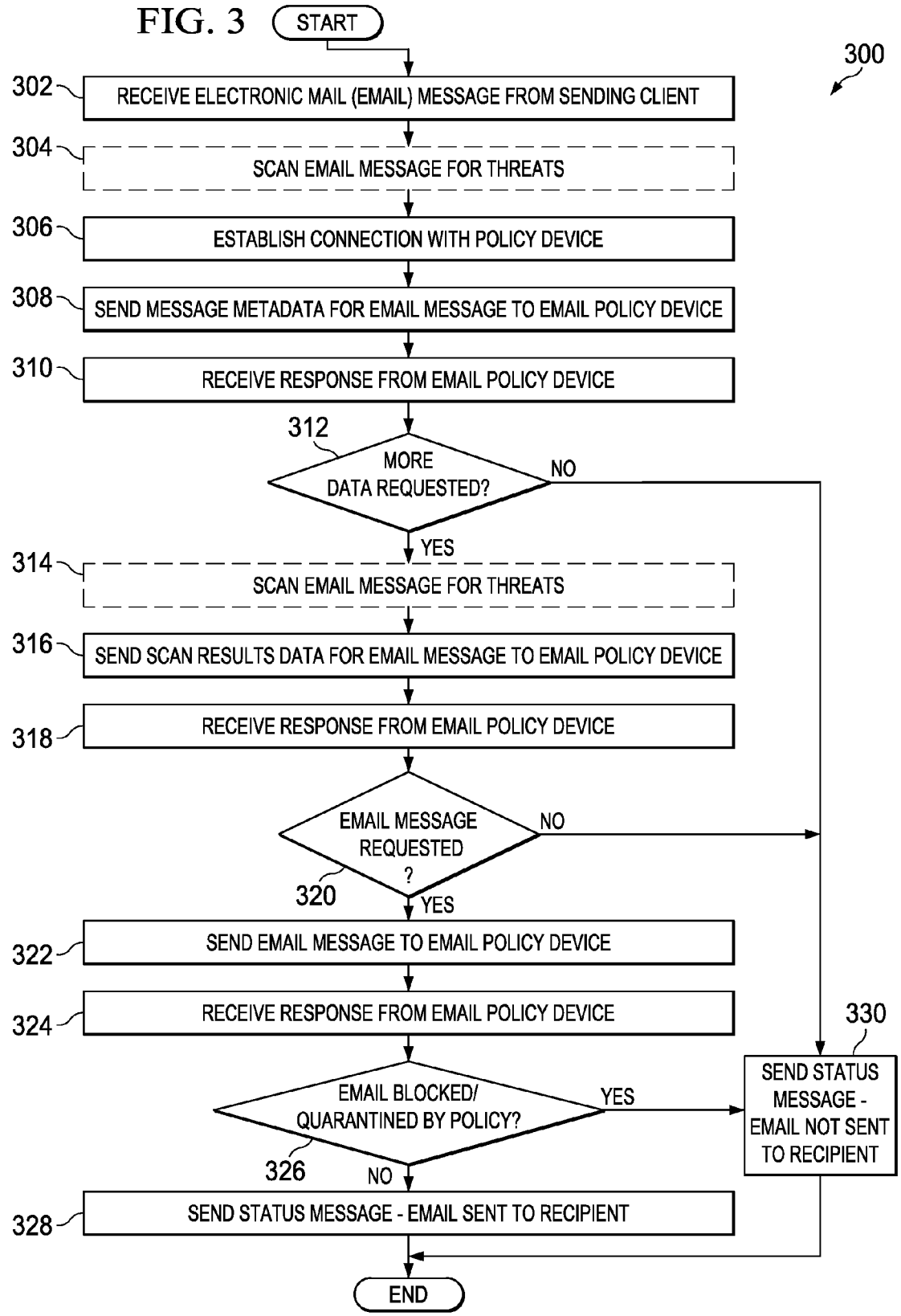

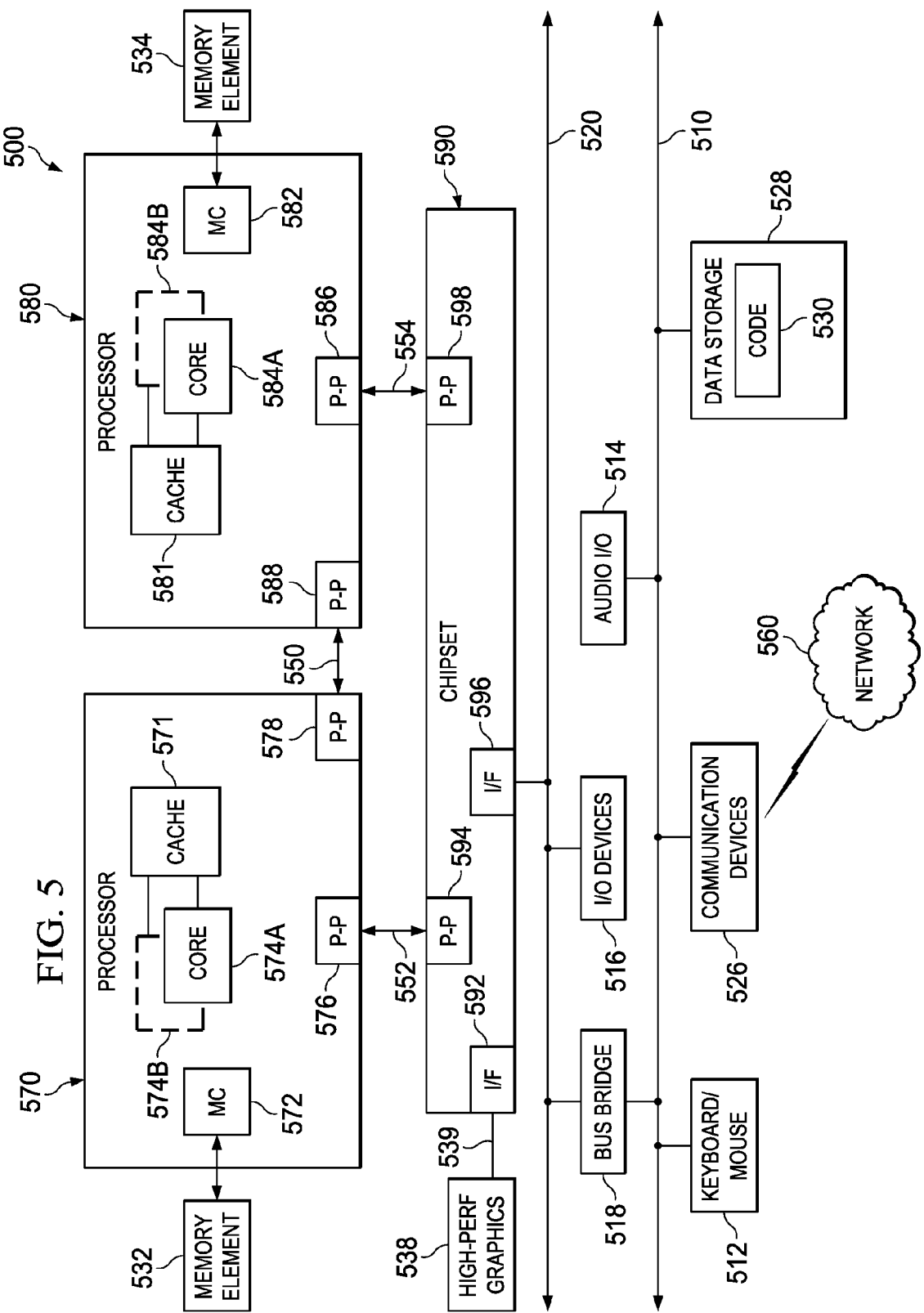

CLOUD EMAIL MESSAGE SCANNING WITH LOCAL POLICY APPLICATION IN A NETWORK ENVIRONMENT

RELATED APPLICATION

This application claims the benefit of priority under 35 U.S.C. §119(e) of U.S. Provisional Application Ser. No. 61/672,222, filed Jul. 16, 2012, by Nicholas Liebmann, et al., entitled "MECHANISM FOR CLOUD EMAIL SCANNING WITH GATEWAY POLICY APPLICATION."

TECHNICAL FIELD

This disclosure relates in general to the field of information security, and more particularly, to cloud email message scanning with local policy application in a network environment.

BACKGROUND

The field of network security has become increasingly important in today's society. The Internet has enabled interconnection of different computer networks all over the world. In particular, the Internet provides a medium for exchanging electronic mail (email) between different users connected to different computer networks via various types of client devices. While the use of email has transformed business and personal communications, it has also been used as a vehicle for malicious operators to gain unauthorized access to computers and computer networks and for intentional or inadvertent disclosure of sensitive information.

Malicious software ("malware") that infects a host computer may be able to perform any number of malicious actions, such as sending out spam or malicious emails from the host computer, stealing sensitive information from a business or individual associated with the host computer, propagating to other host computers, and/or assisting with distributed denial of service attacks, for example. Organizations often protect their computer networks from inbound email threats using some type of email protection device to filter out potentially harmful emails. Cloud services can provide inbound email filtering (e.g., spam, malware), which can help conserve bandwidth for a network. Other mechanisms, however, are generally employed to monitor outbound email, however, to prevent the loss of sensitive or confidential information. Hence, significant administrative challenges remain for protecting computers and computer networks from malicious and inadvertent exploitation via inbound and outbound emails.

BRIEF DESCRIPTION OF THE DRAWINGS

To provide a more complete understanding of the present disclosure and features and advantages thereof reference is made to the following description, taken in conjunction with the accompanying figures, wherein like reference numerals represent like parts, in which:

FIG. 2 is a simplified interaction diagram illustrating potential operations that may be associated with an email threat sensor and an email policy device in accordance with an embodiment;

FIG. 3 is a simplified flowchart illustrating potential operations that may be associated with the communication system in accordance with an embodiment;

FIG. 5 is a block diagram illustrating an example computing system that is arranged in a point-to-point configuration in accordance with an embodiment.

DETAILED DESCRIPTION OF EXAMPLE EMBODIMENTS

Example Embodiments

Figure 1:
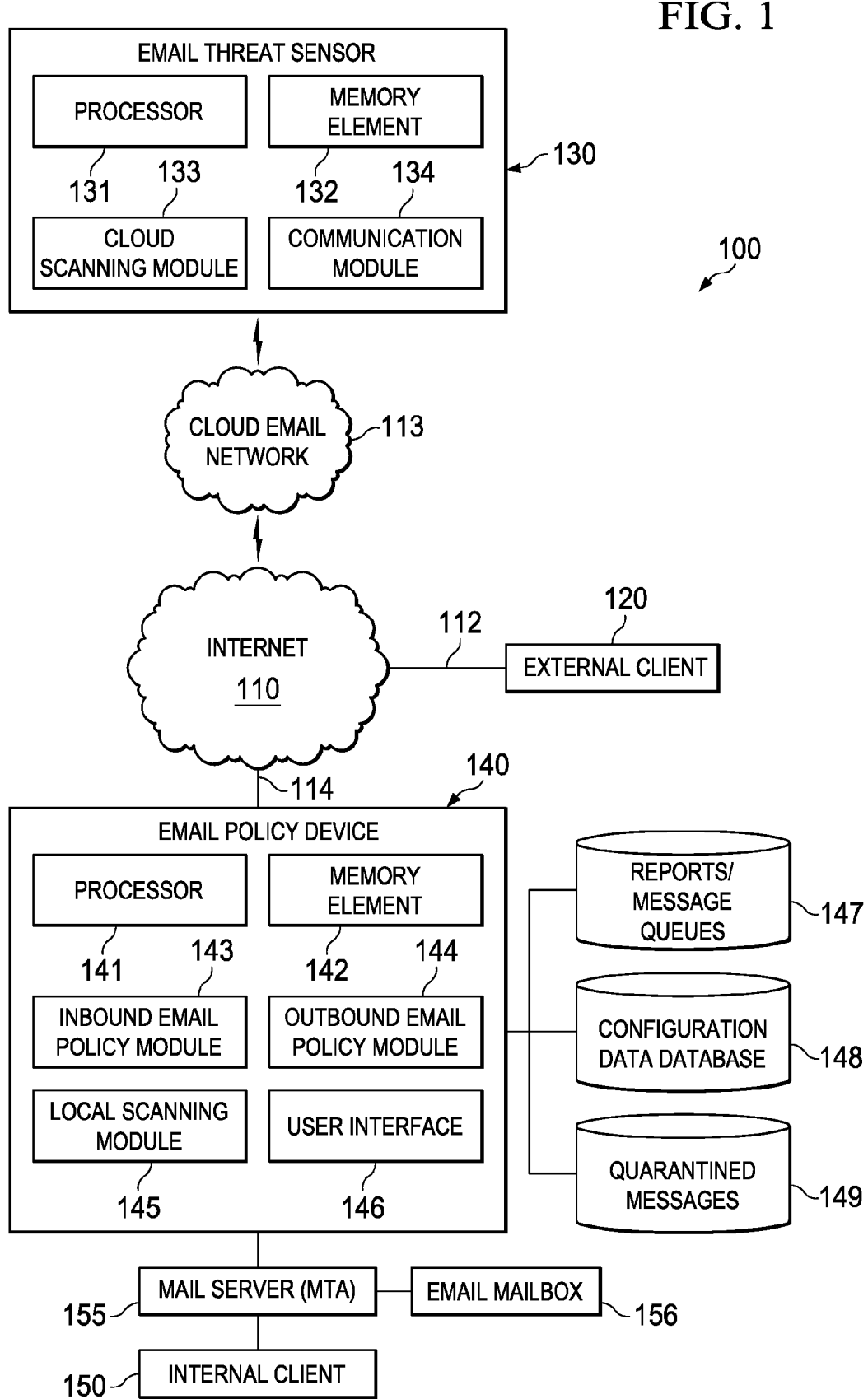
FIG. 1 is a simplified block diagram of a communication system for cloud email message scanning and local policy application in a network environment in accordance with an embodiment of the present disclosure.

FIG. 1 is a simplified block diagram of a communication system 100 for cloud email message scanning and local policy application in a network environment. An email threat sensor 130 in a cloud email network 113 and an email policy device 140 in a protected network 114 can provide cloud email message scanning and local policy application, respectively. FIG. 1 also provides an external client 120 in external network 112, a mail server 155 and an internal client 150 in protected network 114, and Internet 110. Internet 110 facilitates network communications, including electronic mail (email) message exchanges, between network nodes of external network 112, cloud email network 113, and protected network 114. Email threat sensor 130 can include a processor 131, a memory element 132, a cloud scanning module 133 and a communication module 134. Email policy device 140 can include a processor 141, a memory element 142, an inbound email policy module 143, an outbound email policy module 144, a local scanning module 145, and a user interface 146. Also provided in FIG. 1 are storage elements for reports and/or message queues 147, configuration data database 148, and quarantined messages 149. These storage elements may be integrated with, or otherwise electronically accessible by, email policy device 140.

Elements of FIG. 1 may be coupled to one another through one or more interfaces employing any suitable connections wired or wireless), which provide viable pathways for network communications. Additionally, any one or more of these elements of FIG. 1 may be combined or removed from the architecture based on particular configuration needs. Communication system 100 may include a configuration capable of transmission control protocol/Internet protocol (TCP/IP) communications for the transmission or reception of packets in a network. Communication system 100 may also operate in conjunction with a user datagram protocol/IP (UDP/IP) or any other suitable protocol where appropriate and based on particular needs.

In example embodiments, communication system 100 enables cloud scanning of email messages and local policy application in a protected network to block, quarantine, allow, or reroute email messages. In one example, an email message from external client 120 to an intended recipient in protected network 114 can be routed to email threat sensor 130 in cloud email network 113. Email threat sensor 130 can scan the email message for threats and communicate with email policy device 140. The email policy device can apply local policies to message metadata and scan results data to determine whether the email message should be blocked from the protected network. If metadata and scan policies do not prohibit the email message from being received in the protected network, then email policy device 140 can receive the email message, possibly scan the email message for content prohibited by local scan policies, and block, allow, quarantine, or reroute the email message accordingly.

For purposes of illustrating certain example techniques of communication system 100, it is important to understand the communications that may be traversing the network environment. The following foundational information may be viewed as a basis from which the present disclosure may be properly explained.

Threats from both inbound and outbound electronic mail can disrupt a computer network and lead to unstable and/or insecure systems. Inbound email, for example, can contain, generate, call, respond to, or otherwise be associated with malware that can infect a receiving client and/or host and potentially propagate to other network elements and clients within the computer network. As used herein, a 'threat' includes malicious software (malware), which is a broad term commonly used to describe software designed to engage in hostile and/or unwanted behavior on a computer, and generally includes any software designed to interfere with the normal operation of a computer or network, to gain unauthorized access to a computer system, and/or to destroy, disclose, or modify data. Examples of malware can include, but are not limited to, viruses, spam, phishing scams, denial-of-service (DOS) attacks, directory harvest, botnets, spyware, adware, trojans, and worms. Threats can also include emails that are not compliant with network policies and/or emails that contain sensitive or confidential information and that are not authorized to communicate that information.

To combat threats from inbound emails to a protected network, an email protection device may be located in the protected network at a gateway to the Internet, or otherwise situated to receive the inbound emails. An email protection device can provide virus scanning for emails and can filter out emails containing malware or other undesirable content (e.g., rude words, pornographic materials, etc.), or other emails generated from or otherwise associated with malware. In this scenario, every email having a destination address in the protected network is received in the protected network in order to be scanned. Malware scanning typically involves decomposing and scanning a message. Consequently, a significant amount of bandwidth in the network may be consumed by emails. Moreover, denial of service attacks may not be prevented if the network receives all emails in order to scan them.

Another technique for protecting a network from threats in inbound emails involves cloud email services. Cloud services are generally defined as the use of computing resources that are delivered as a service over a network, such as the Internet. Typically, compute, storage, and network resources are offered in a cloud infrastructure, effectively shifting the workload from a local network to the cloud network. Cloud email services employed by a particular network can include receiving inbound emails for the particular network, scanning the emails for potential threats, filtering out emails associated with malware or containing other undesirable content (e.g., based on virus scanning, spam scanning, and/or other compliance criteria), and forwarding unfiltered emails to the network. Accordingly, cloud email services may apply policies of the destination network to filter out emails containing certain malware and/or other undesirable content.

In order to apply network specific policies to filter email messages in a cloud network for a particular protected network, network specific configurations of the protected network are provided to the cloud. In some implementations, a network administrator of the protected network may access the cloud services to add and/or update their network specific configurations. In other implementations, a network administrator may add and/or update their network specific configurations locally and then push the configurations to the cloud. Cloud services are often geographically distributed, and may even be distributed around the world. Consequently, a delay may occur in updating the network specific configurations in all of the cloud sites. Thus, some cloud email services may not be synchronized with the same network specific configurations when updates to the configurations are made.

Although cloud email services can provide threat protection for inbound emails to a given network while conserving bandwidth of the network, a local solution may nevertheless still be needed to prevent confidential or sensitive information from leaving the network without proper authorization. For example, outbound mail from the network may be delivered via an on-premise appliance (or other suitable network element), which can perform compliance and data loss prevention scanning. When disparate systems provide inbound-specific email protections and outbound-specific email protections, they are often administered and managed via separate user interfaces. Consequently, separate user configurations, reports, message queues, and message quarantines may be provided by these multiple disparate systems, resulting in burdensome administrative tasks for the network administrators.

A communication system for cloud email scanning and local policy application in a network environment, as outlined in FIG. 1 can resolve these issues (and others). In communication system 100 of FIG. 1, a hybrid solution allows an inbound email message to a protected network to be scanned by cloud email services and policies of the protected network to be evaluated locally in the network and applied to the email message by an email policy device of the network. Outbound email messages from the network may be filtered at the email policy device before leaving the network. Communication system 100 applies policies and reports threat detections in real-time without having to store user configurations in locations other than the email policy device, which may be an on-premise device. Whether the email message is actually received in the protected network is a function of the user configurations. If the email message data is not required to perform any action, then the email message itself may be rejected by the email policy device. More specifically, an email message containing a threat can be blocked by the email policy device based on information in message metadata or scan results data from the cloud email services, before data transfer of the email message to the protected network occurs. Thus, bandwidth of the protected network can be saved. Additionally, centralized management can be provided by the email policy device in the protected network, including configuration, management, reporting, and quarantining. An authorized user can administer both the cloud email services and the on-premise email policy device through a single user interface, which may be provided through the email policy device.

Turning to the infrastructure of FIG. 1, communication system 100 in accordance with an example embodiment is shown. Generally, communication system 100 can be implemented in any type or topology of networks. Protected network 114, Internet 110, cloud email network 113, and external network 112 each represent a series of points or nodes of interconnected communication paths for receiving and transmitting packets of information that propagate through communication system 100. These networks offer a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In communication system 100, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications over a cellular network may also be provided in communication system 100. Suitable interfaces and infrastructure may be provided to enable communication with the cellular network.

A packet is a unit of data that can be routed between a source node and a destination node on a packet switched network, such as Internet 110. A packet includes a source network address and a destination network address. These network addresses can be Internet Protocol (IP) addresses in a TCP/IP messaging protocol. The term 'data' as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

As referred to herein, a 'protected network', such as protected network 114, is intended to mean a network that is owned or otherwise under the control of a particular entity or organization, and that is configured for protection against threats from inbound (and possibly outbound) email messages. Communications attempting to reach certain nodes in a protected network, such as a mail server, are first routed through one or more network elements of the protected network, such as a gateway, firewall, proxy server, security appliance, etc. In an example embodiment, a protected network may be a private network that uses private address space (e.g., Internet Protocol (IP) address space) for its nodes on the network. Private address space may follow standards set by Network Working Group, Requests for Comments (RFC) 1918, Y. Rekhter, et al., February 1996 and/or Network Working Group, Requests for Comments (RFC) 4193, R. Hinden, et al., October 2005. A protected network may also or alternatively implement any other suitable forms of address spacing that allows a particular entity or organization to control network communications to and from the protected network.

External network 112 can represent any other network, external to protected network 114, that is capable of sending email messages to and/or receiving email messages from protected network 114 via Internet 110. Cloud email network 113 can represent computing resources that deliver email threat services to protected network 114 over Internet 110.

For ease of explanation, FIG. 1 illustrates an implementation in which Internet 110 facilitates network communications between external network 112, cloud email network 113, and protected network 114. However, any other public, unprotected network may be used to facilitate these network communications. Additionally, the concepts disclosed herein are equally applicable within a private network (e.g., an intranet), where both the external client and the cloud email service could be provisioned within the private network or virtual private network (VPN). For example, an organization may host its own cloud email service (internal to its private network), and multiple email policy devices within its organization (e.g., by department, by building, etc.). Furthermore, the email policy devices may or may not be geographically disparate in a private network.

Generally, in the several aforementioned implementations, an inbound email message to protected network 114 can be redirected to email threat sensor 130 of cloud email network 113. This can occur via an unprotected network such as Internet 110, or via a private network such as an organization's intranet. Email threat sensor 130 can perform anti-virus and/or anti-spam scanning on the received email messages in order to identify potential threats. Communications between email policy device 140 and email threat sensor 130 determine whether to block or quarantine the email message, or whether to allow the email message to be forwarded to mail server 155 in protected network 114. If the email message is forwarded, internal client 150 may be used to access the email message via mail server 155, or mail server 155 may transfer the email message to internal client 150.

In an example implementation, email threat sensor 130 and email policy device 140 are network elements, which are meant to encompass network appliances, servers, routers, switches, gateways, bridges, load balancers, processors, modules, or any other suitable device, component, element, or object operable to exchange information in a network environment. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

In regards to the internal structure associated with communication system 100, each of email threat sensor 130 and email policy device 140 can include memory elements (e.g., memory elements 132, 142) for storing information to be used in the operations outlined herein. Each of email threat sensor 130 and email policy device 140 may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein (e.g., memory elements 132, 142) should be construed as being encompassed within the broad term 'memory element.' Moreover, the information being used, tracked, sent, or received in communication system 100 could be provided in any database, register, queue, table, cache, control list, or other storage structure, all of which can be referenced at any suitable timeframe. Any such storage options (e.g., reports/message queues 147, configuration data database 148, quarantined messages 149) may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, network elements of communication system 100, such as email threat sensor 130 and/or email policy device 140, may include software modules (e.g., cloud scanning module 133, communication module 134, inbound email policy module 143, outbound email policy module 144, and/or local scanning module 145) to achieve, or, to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, each of email threat sensor 130 and email policy device 140 may include a processor (e.g., processors 131, 141) that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

External and internal email clients 120 and 150 may be any systems configured to enable access to and management of respective email mailboxes. In an embodiment, external and internal email clients 120 and 150 may be configured as computer programs or mail user agents (MUAs) for connecting to respective mail servers. For example, internal email client 150 may connect to mail server 155 to retrieve email messages from an associated email mailbox. In an embodiment, external and internal clients 120 and 150 may be provided within their respective networks in wired or wireless network nodes that may generally serve as terminal points for a network connection. Such nodes could include, for example, desktop computers, laptop computers, mobile devices, personal digital assistants, smartphones, tablets, or other similar devices.

Mail server 155, can be a network element that includes a message transfer agent (MTA) for transferring email messages from one computer to another using a client—server application architecture. Mail server 155 can receive an email message from another mail server (e.g., via email threat sensor 130 and email policy device 140) and can deliver the email message to its intended recipient. The 'intended recipient' can be an email mailbox, such as email mailbox 156, that is a repository for receiving and storing email messages for a particular user or account. The email mailbox may be provided on mail server 155 (e.g., email mailbox 156), may be provided on a network node hosting a receiving email client (e.g., internal client 150), or may be provided in another storage element accessible to the mail server and the receiving email client. The email mailbox can be identified in a recipient email address of the email message by a local address or username placed before an '@' symbol in the recipient email address.

External client 120 may connect to another mail server (not shown), which may be provisioned in a protected network with external client 120. Alternatively, the mail server could be provisioned in a cloud network (e.g., via the Internet), provisioned in another network to which external client 120 remotely connects, or integrated with external client 120.

Cloud email network 113 can include network elements, such as email threat sensor 130, to provide email threat services to other networks such as protected network 114. Cloud email network 113 may also include other network elements such as, for example, one or more gateways, appliances, firewalls, servers, and/or other devices, components, elements, or objects that facilitate email threat services for a network that receives electronic mail. Cloud scanning module 133 of email threat sensor 130 can include one or more anti-virus and/or anti-spam components for decomposing email messages and performing operationally intensive scanning of their various components (e.g., message data, attachments, hyperlinks, etc.) to identify malware, spam, or other threats.

Communication module 134 of email threat sensor 130 can provide email message information to an email policy device of a protected network for which cloud email network 113 provides email threat services. For example, when email threat sensor 130 receives an email message for an intended recipient in protected network 114, communication module 134 can provide message metadata, scan results, and email message data to email policy device 140, as needed. In addition, communication module 134 can receive responses from email policy device 140 based on information received from communication module 134. Responses can indicate whether more data (e.g., scan results, email message data) is requested, or whether an email message should be blocked based on policy.

Email policy device 140 can be a network element in protected network 114. In an example embodiment, email policy device 140 may be implemented in protected network 114 to receive communications from email threat sensor 130 and inbound email messages before they are forwarded to an intended recipient according to an email address. Email policy device 140 may also receive outbound email messages from internal clients via mail server 155 before they are forwarded to an external client via another mail server.

User interface 146 can be provided to allow an authorized user (e.g., network administrator) to enter configurations for email messages inbound to protected network 114 or outbound from protected network 114. In an example embodiment, user interface 146 can include a console with a graphical user interface (GUI) and appropriate input device (e.g., keyboard, mouse, trackball, touchscreen, etc.) to allow the user to enter configuration data that may be stored in configuration data database 148.

Configuration data can include policies based on certain message metadata and/or scan results. For example, configuration data can include a policy to block (or allow) an email message if a scan result of the email message indicates a virus is present. Configuration data could also include policies to allow an email message if a scan result indicates a certain type of malware, which is not a virus, is present.

Other configuration data can include a spam threshold setting (e.g., 1-10). In this example, if the threshold is exceeded, then the email message is identified as spam and may be blocked. In an example scenario, a user may configure a higher threshold setting for certain types of desired email content (e.g., advertisements for a particular medication) in order to allow such email messages to be received. Configuration data could also be based on a sender of the email message (e.g., a domain name or a particular IP address). For example, the configuration data could include a policy to turn off spam scanning for email messages from a particular sender IP address.

A user may also configure different actions to be taken on email messages depending on the policy. Exemplary actions include blocking an email message from being sent to the protected network, blocking an email message from being sent to an intended recipient of an email address in the protected network, or quarantining an email message.

Inbound email policy module 143 can apply policies from configuration data database 148 based on message metadata and/or scan results associated with inbound email messages. Inbound email policy module 143 can also can send appropriate responses to email threat sensor 130 based on the policy evaluations.

Configuration data may also contain policies that require additional scanning of some or all email messages for network specific content (e.g., image analysis, prohibited words/phrases, confidential and/or sensitive information, etc.) to be identified and/or filtered out. Local scanning module 145 may be configured to scan email messages for network specific content not included in the cloud scans. Local scanning can include, for example, scanning of inbound or outbound email messages to apply network specific image and/or textual analysis (e.g., for pornographic materials, unacceptable images, words or phrases, etc.) that was not applied in the cloud scans. Local scanning may also include scanning to identify and potentially filter out sensitive and confidential information passing through email policy device 140.

Email policy device 140 may also save certain information for reporting and informational purposes. Reports/message queues 147 may be populated with message metadata and/or information such as which email messages are blocked and the reasons for the blockings. Thus, users can have access to on-premise (or local) reporting for email message issues. Quarantined messages 149 may contain message data of email messages that are blocked by email policy device 140 from being forwarded to their destination addresses in protected network 114.

Although reports message queues 147, configuration data database 148, and quarantined messages 149 are represented in FIG. 1 as separate storage elements, this is for illustrative purposes only. These storage elements could be combined or separated in any suitable configuration. Furthermore, these storage elements could be integrated with email policy device 140 or distributed in protected network 114 or in another network accessible by email policy device 140.

Turning to FIG. 2, an interaction diagram 200 illustrates potential network communications between external client 120, email threat sensor 130, email policy device 140, and mail server 155 in accordance with an example embodiment. In this example interaction, external client 120 is the source (or 'sending client' of an email message being sent to mail server 155, which is the destination (or 'receiving host') of the email message and which hosts email mailbox 156. In this example, email mailbox 156 is the intended recipient of the email message. The email message being sent may be in the form of packets having a source IP address of the sending host or mail server associated with external client 120, and a destination IP address of mail server 155 in protected network 114.

At 202, external client 120 sends an email message to a recipient email address that identifies email mailbox 156 hosted on mail server 155 in protected network 114. The email message is routed to email threat sensor 130 in cloud email network 113. In one example implementation, the email message may be routed using mail exchanger (MX) records of a domain name system (DNS). One or more MX records of a domain name can specify how the email message is to be routed within Simple Mail Transfer Protocol (SMTP). SMTP is an Internet standard protocol for electronic mail transmission across Internet Protocol networks. In this scenario, cloud email network 113 may be configured to provide email threat services to protected network 114 and, therefore, receives all inbound email messages to protected network 114.

At 204, email threat sensor 130 initiates a network connection with email policy device 140 using a suitable email protocol. In an example embodiment, SMTP may be used. SMTP was updated in Request for Comments (RFC) 5321, J. Klensin, et al., October 2008, and includes the extended SMTP (ESMTP) additions.

In an example implementation, at 206, email policy device 140 can accept the network connection and advertise whether it supports bespoke extensions to the SMTP protocol. Bespoke extensions can be configured to allow email threat sensor 130 to convey additional information (e.g., message metadata, scan results data) about an email message to email policy device 140. In an embodiment, ESMTP commands are private and advertised by email policy device 140 when an encrypted connection is made from email threat sensor 130 to email policy device 140. In other implementations, any other suitable protocols may be used to enable communications of additional information between email threat sensor 130 and email policy device 140. In a particular example, at least some portions of the relevant RFCs may be ignored, and non-standard commands/protocols within an SMTP conversation may be implemented to enable such communications.

Once the network connection is established between email threat sensor 130 and email policy device 140, and assuming bespoke extensions or other suitable protocols are supported, email threat sensor 130 may send, at 208, message metadata to email policy device 140. Message metadata could include, but is not limited to, connection and/or protocol information for the email message. Connection information can include the IP address of the sending host (e.g., mail server corresponding to external client 120) and the domain of the sending host. Protocol information could include standard SMTP information (e.g., sender and recipient information). In particular, protocol information can include a sender email address or domain name, which could be different than the actual sending host of the email message. Protocol information can also include a recipient email address or domain. This can be used to enable blocking an email message from being forwarded to protected network 114 if the intended recipient (email mailbox) does not exist within the protected network.

At 210, email policy device 140 evaluates the received message metadata and metadata policies. Evaluating message metadata can include reading and interpreting the metadata. Also, metadata policies (e.g., from configuration data database 148) can be evaluated to determine whether any apply to the received message metadata. It may be determined, based on the received message metadata, whether receiving the email message in protected network 114 (e.g., by inbound email policy module 143) is prohibited by a metadata policy. These policies can be configured by an authorized user in user interface of email policy device 140. These policies can be stored, for example, in configuration data database 148. The email policy device may be an on-premise, local appliance or other network element, which could be readily accessible to the authorized user.

Different actions may be taken depending on the content of the metadata and the applicable policies. Blocking an email message is an example of one possible action that may be taken. A blocking action may be taken to prevent an email message from entering the protected network. Entering the protected network occurs when the email message is forwarded to any node in the protected network from another network. This blocking action may be taken if a policy prohibits an email message that has particular message metadata (e.g., particular source IP address or source domain) from being received in (or entering) the protected network.

Quarantining the email message is another example of a possible action that may be taken. In this case, the policy may permit the protected network to receive the email message (e.g., at the email policy device 140), but prohibit the email message from being forwarded to the intended recipient in the protected network, as will be further described herein. Quarantining can include saving the email message (e.g., in quarantined messages 149) and blocking the email message from being forwarded to the intended recipient. Additionally, a blocking action may also be taken after the email message has been received in (entered) the protected network, based on local scanning results, as will be further described herein.

Numerous different policy configurations are possible for managing email messages based on message metadata. In one possible configuration, a policy may expressly identify a particular sending host network address, a sending host domain name, a sender email address, and/or a sender domain name to be blocked, allowed, or quarantined. In another possible configuration, a pattern match could be used to determine what domain to block. For example, if a look-up of an IP address of a sending host returns XYZ.com, then *.XYZ.com could be blocked. In another configuration, a policy may contain a rule to block an email message from being forwarded to protected network 114 if its recipient (or destination) email username does not exist within protected network 114. These example configurations are for illustrative purposes and are not intended to limit the numerous configuration possibilities for managing email messages based on message metadata. Additionally, if it is determined that an email message is prohibited by a policy based on its message metadata, then the blocking and/or quarantining action and any related information may be logged, for example, in reports/message queues 147.

At 212, email policy device 140 may send a response to email threat sensor 130 based on its evaluation of the message metadata and the application of any relevant metadata policies. In an embodiment, the response can be a code that indicates whether to send more information associated with the email message to email policy device 140. Thus, if no policies are configured to block the email message based on the email message's particular metadata, then the response code can represent a request for more data. More data can include scan results data (e.g., anti-virus and/or anti-spam scan results data) of the email message. However, if a policy is configured that prohibits the email message based on the email message's particular metadata, then the response code can represent a request that no further data associated with the email message be sent to email policy device 140. Thus, the email message may be effectively blocked from the protected network in this scenario.

At 214, email threat sensor 130 determines whether the response represents a request for more data. If it does not represent a request for more data, then at 236, email threat sensor 130 may send an email message status to the sending external client 120 indicating that the email message was not delivered to its intended recipient. However, if the response is a request for more data, then at 216, the email message can be scanned (e.g., anti-virus scan, anti-spam scan). In an embodiment, cloud scanning module 133 may perform the scanning operations. Scanning can be an intensive operation, using processing resources of email threat sensor 130, by decomposing the message and performing scans on message data, attachments, and/or hyperlinks contained in the email message.

At 218, email threat sensor 130 can send the scan results data for the email message to email policy server 140. At 220, email policy device 140 evaluates the scan results data of the email message and scan policies. Evaluating scan results data can include reading and interpreting the scan results data. Also, scan policies (e.g., from configuration data database 148) can be evaluated to determine whether any apply to the received scan results data. In particular, it may be determined, based on the received scan results data, whether receiving the email message in protected network 114 (e.g., by inbound email policy module 143) is prohibited by a scan policy. These policies can be configured by an authorized user in user interface of email policy device 140. Because configuration data database 148 can be maintained via user interface 146 of email policy device 140, updates to configuration data database 148 may be immediately accessible in real-time to email policy device 140.

Numerous different configurations and actions (e.g., blocking, quarantining, allowing, rerouting, etc.) are possible for managing email messages based on email message scan results data and scan policies. Different entities may have different thresholds of tolerance for spam and/or viral communications in their protected networks. A given network may have a higher threshold set for accepting spam emails than another network. A given network may have policies that prohibit any email messages with an identified virus from being received by any node in the network. Another network may have policies that allow email messages with identified viruses to be received in the network if, for example, the viral email messages are needed for business purposes. In yet other configurations, a given network may have policies that prohibit an email message with an identified virus (or spam) from being delivered to a recipient email address in the network, but may nevertheless opt to receive the email message in the network in some type of security device e.g., email policy device 140) in order to quarantine it (e.g., in quarantined messages 149).

In another example, a given network may allow particular email advertisements that may be pertinent to the business associated with the network. If email threat sensor 130 typically identifies these email advertisements as spam in its anti-spam scan, then policies may be configured at email policy device 140 (e.g., via user interface 146) to allow this particular type of email advertisement. A threshold number may be set to indicate when an email is identified as spam. A higher threshold number may be set if the network has a higher tolerance for accepting spam. Moreover, spam tolerance thresholds may be configured per user, per groups of users, or per network. This configuration may also, or alternatively, be configured based on a sender of the email message (e.g., domain name of a particular email address). Accordingly, spam filtering could be turned off for particular trusted domains. Thus, network specific logic for inbound and outbound email messages may be controlled within a network, without relying on pushing configuration data to a cloud service.

If it is determined that an email message is blocked or quarantined by a policy based on its scan results data, then the blocking or quarantining action and any related information may be logged, for example, in reports/message queues 147. These example configurations are for illustrative purposes and are not intended to limit the numerous configuration possibilities for managing email messages based on scan results data.

At 222, email policy device 140 may send a response to email threat sensor 130 based on its evaluation of the scan results data and the application of any relevant scan policies. In an embodiment, the response can be a code that indicates whether to send the email message to email policy device 140. Thus, if no policies are configured to prevent the email message from being received in protected network 114 based on the email message's particular scan results data, then the response code can represent a request for the email message. A request for the email message may also be sent when policies prohibit the email message from being forwarded to its recipient email address, but allow the email message to be received by the protected network (e.g., by email policy device 140) for additional processing and/or quarantining purposes. If a policy is configured to block the email message from being received in protected network 114 based on the email message's particular scan results, however, then the response code can represent a request that no further data associated with the email message be sent to email policy device 140. Thus, the email message may be effectively blocked from the protected network in this scenario.

At 224, email threat sensor 130 determines whether the response represents a request for the email message. If it does not represent a request for the email message, then at 236, email threat sensor 130 may send an email message status to the sending external client 120 indicating that the email message was not delivered to its intended recipient. However, if the response is a request for the email message, then at 226, email threat sensor 130 can forward the email message to email policy server 140.

At 228, email policy device 140 may perform further processing on the email message. In an embodiment, additional scanning may be performed for network specific content that is not allowed in the particular protected network, but is not necessarily filtered by cloud scanning. For example, a given network may not allow certain types of images (e.g., pornographic images) or certain words or phrases (e.g., profanity). If email threat sensor 130 does not identify these items in its anti-virus and/or anti-spam scans, then local scan policies may be configured at email policy device 140 (e.g., via user interface 146) and applied to email messages received from email threat sensor 130. Scanning may also be performed for confidential or sensitive information to control receipt of such information (e.g., via inbound email messages) and dissemination of such information (e.g., via outbound email messages).

Either blocking or quarantining actions may be taken on the email message at the email policy device 140. The action may depend upon the local scan results (if any), and upon the previous evaluations of message metadata and scan results data (if applicable policies indicated the email message should be quarantined at 210 and/or 220). A blocking action can prevent the email message from being delivered to its intended recipient. A quarantining action may quarantine the email message by saving it in quarantined messages 149. In yet another implementation, the email message could be rerouted to another location, for example, for additional analysis.

At 230, a determination is made as to whether the email message is prohibited by policy based on additional scanning for network specific prohibited content. If the email message is not prohibited by policy (e.g., additional scanning was not performed or additional scanning was performed but did not indicate the email message is prohibited), then at 232, the email message can be forwarded to mail server 155, which can deliver the message to email mailbox 156.

The delivery of the email message at 232, to mail server 155, may be determined by any suitable mechanism, which can be implemented based on particular needs of protected network 114. For example, standard SMTP mail delivery rules may be used. A domain name system (DNS) may be queried using the recipient email address in the email message, and various types of DNS records (e.g., MX records, A records) can provide a network address of mail server 155. In another implementation, the delivery may be determined via a preconfigured route. A network administrator may configure email policy device 140 to forward email messages for a specific domain, indicated in the recipient email address, to a particular destination network address (e.g., of mail server 155). In yet another implementation, the delivery may be determined via an alternate directory service. A network administrator may configure email policy device 140 to look up an attribute in a directory service (e.g., LDAP/Active Directory) to determine a destination network address (e.g., of mail server 155).

If additional scanning is performed at 228, and it is determined that one or more local scan policies prohibit the email message from being delivered to its intended recipient in protected network 114, then the email message may be either blocked or quarantined. At 234, email policy device 140 sends a response to email threat sensor 130 indicating that the email message has been blocked or quarantined. At 236, email threat sensor 130 may send a status to sending external client 120 indicating that the email message was not delivered to its intended recipient.

At 230, another determination may also be made as to whether a policy requires the email message to be quarantined, based on previous evaluations of message metadata and metadata policies at 210) and scan results data and scan policies (at 220). In this scenario, the email message is not blocked from being received by email policy device 140, but may be blocked at 230 from being forwarded to mail server 155. Thus, at 226, the email message is received by email policy device 140. The email message may or may not require additional scanning, but a determination is made as to whether previous policy evaluations require the email message to be quarantined.

If the email message is not required to be quarantined and is not blocked based on local scanning policies, then at 232, the email message can be forwarded to mail server 155, which can deliver the message to email mailbox 156. At 234, email policy device 140 may send a response to email threat sensor 130 indicating that the email message was delivered to its intended recipient. At 236, email threat sensor 130 may then send a status to sending external client 120 indicating that the email message was delivered to its intended recipient.

If it is determined at 230 that the email message is required to be quarantined, then the email message is quarantined, for example, by storing it in quarantined messages 149. At 234, email policy device 140 sends a response to email threat sensor 130 indicating that the email message has been blocked or quarantined. At 236, email threat sensor 130 may send a status to sending external client 120 indicating that the email message was not delivered to its intended recipient.

In another implementation option, email policy device 140 may be configured by a network administrator to deliver certain email messages to their intended recipients, even if the email messages violate one or more of the metadata, scan, and/or local scan policies. If threats and/or prohibited content is detected in an email message, then the detection may be logged and/or a notification may be sent to an appropriate user or system. Similarly, if message metadata of an email message violates a metadata policy, then the violation can be logged and/or a notification may be sent. The email message may be delivered to its intended recipient. Alternatively, the email message may be forwarded to a specified destination network address for further scanning, remote quarantining, or inspection.

Turning to FIG. 3, an example flowchart illustrates possible operations of a flow 300 that may be associated with email threat sensor 130. In an embodiment, one or more operations of flow 300 may be performed by scanning module 133 and/or communication module 134.

At 302, email threat sensor 130 receives an electronic mail message being sent from a sending client to an intended recipient in a protected network. The intended recipient can be an email mailbox of a mail server in the protected network. The intended recipient may be identified in a recipient email address of the email message. More specifically, a local address (or username) corresponding to the email mailbox, and a domain name corresponding to the protected network may be provided in the recipient email address. The sending client may be external to the protected network in which the mail server is configured.

At 304, the email message may be scanned (e.g., by scanning module 133) for threats such as malware and spam. In this example embodiment, scanning the email message (at 304) occurs prior to email threat sensor 130 connecting to the email policy device of the protected network. In other embodiments, however, scanning the email message may occur after some communication between email threat sensor 130 and email policy device 140, as will be further described herein.

At 306, the email threat sensor establishes a connection with the email policy device in the protected network. The email policy device may also advertise whether it supports a protocol, such as bespoke extensions to the SMTP protocol, to allow the email threat sensor to send additional information (e.g., message metadata, scan results data) about the email message. At 308, the email threat sensor sends message metadata of the email message to the email policy device. The message metadata may include connection information and/or protocol information associated with the email message.

At 310, the email threat sensor receives a response from the email policy device. The response may be based on policy configurations of the email policy device that apply to message metadata. At 312, a determination is made as to whether the response represents a request for more data associated with the email message. If the response is not a request for more data, then the response indicates that receiving the email message in the protected network is prohibited by a metadata policy. In this case, the email threat sensor may send a status message at 330 to inform the sending client that the email message was not received by the intended recipient.

If the response from the email policy device is a request for more data, then at 314, the email message may be scanned (e.g., by scanning module 133). The scanning at 314 represents another embodiment in which the email message is scanned after the email threat sensor has connected to the email policy device, and after it is determined that metadata policies do not prohibit the email message from being received in the protected network. Thus, email messages that are blocked by policy based on message metadata may not be scanned at all. Accordingly, processing may be saved by performing the scanning at 314 rather than at 304.

At 316, the email threat sensor can send the scan results data to be email policy device. At 318, the email threat sensor receives a response from the email policy device. The response may be based on policy configurations of the email policy device that apply to the scan results data.

At 320, a determination is made as to whether the response represents a request for the email message. If the response is not a request for the email message, then the response indicates that receiving the email message in the protected network is prohibited by a scan policy. In this case, the email threat sensor may send a status message at 330 to inform the sending client that the email message was not received by the intended recipient.

If it is determined at 320, that the response from the email policy device is a request for the email message, then at 322, the email threat sensor sends the email message to the email policy device. At 324, the email threat sensor receives a response from the email policy device. The response may be based on policy configurations that apply to additional scanning of the email message. However, if additional scanning was not performed, then the response may be based on the email message being sent to the intended recipient.

After receiving the response from the email policy device at 324, at 326, it is determined whether the email message was blocked or quarantined by policy on the email policy device. If the email message was blocked or quarantined, then the email threat sensor may send a status message at 330 to inform the sending client that the email message was not sent to the intended recipient. If the email message was not blocked or quarantined, however, then the email threat sensor may send a status message at 328 to inform the sending client that the email message was sent to the intended recipient.

Figure 4A:
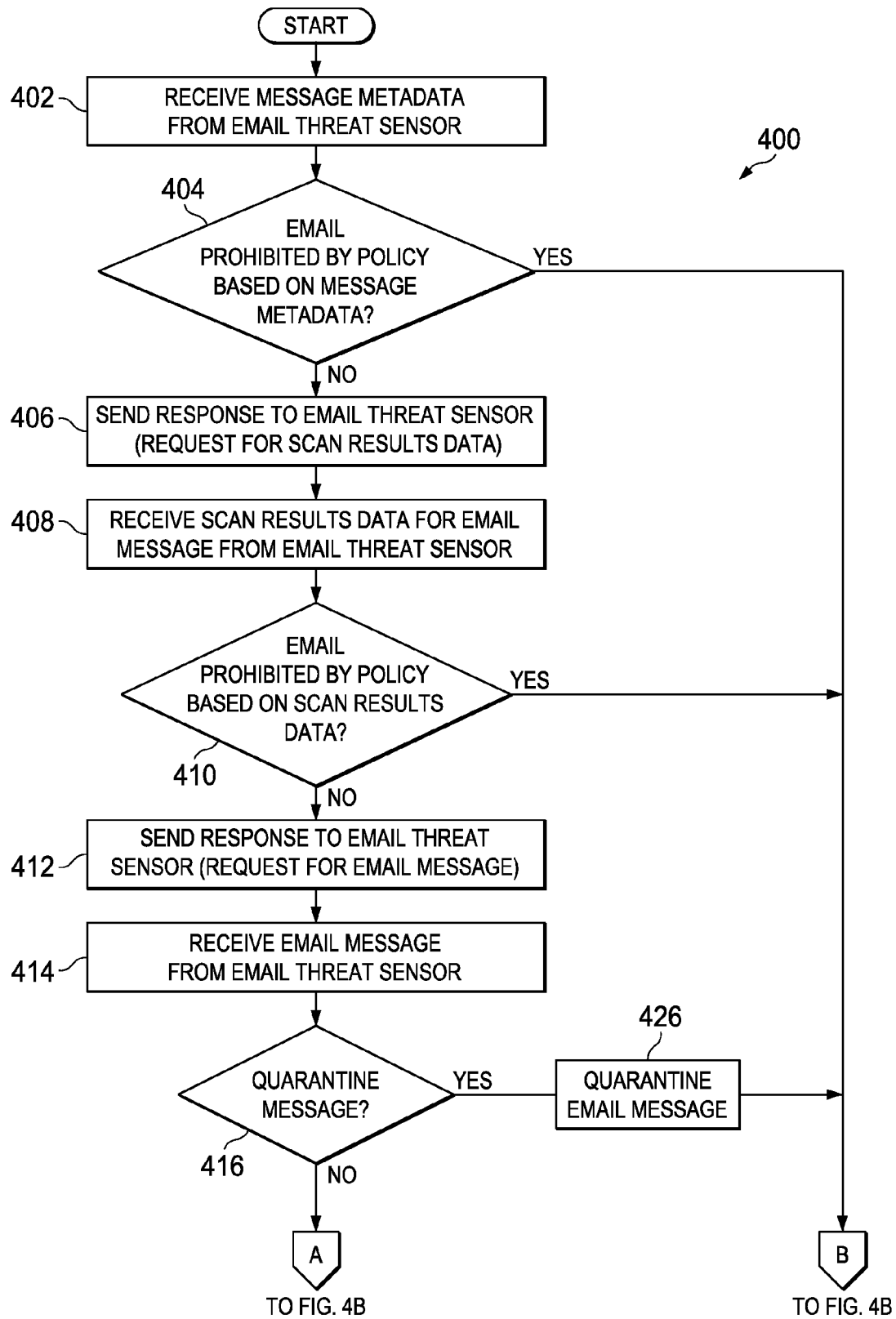
FIGS. 4A and 4B show a simplified flowchart illustrating additional potential operations that may be associated with the communication system in accordance with an embodiment.
Figure 4B:
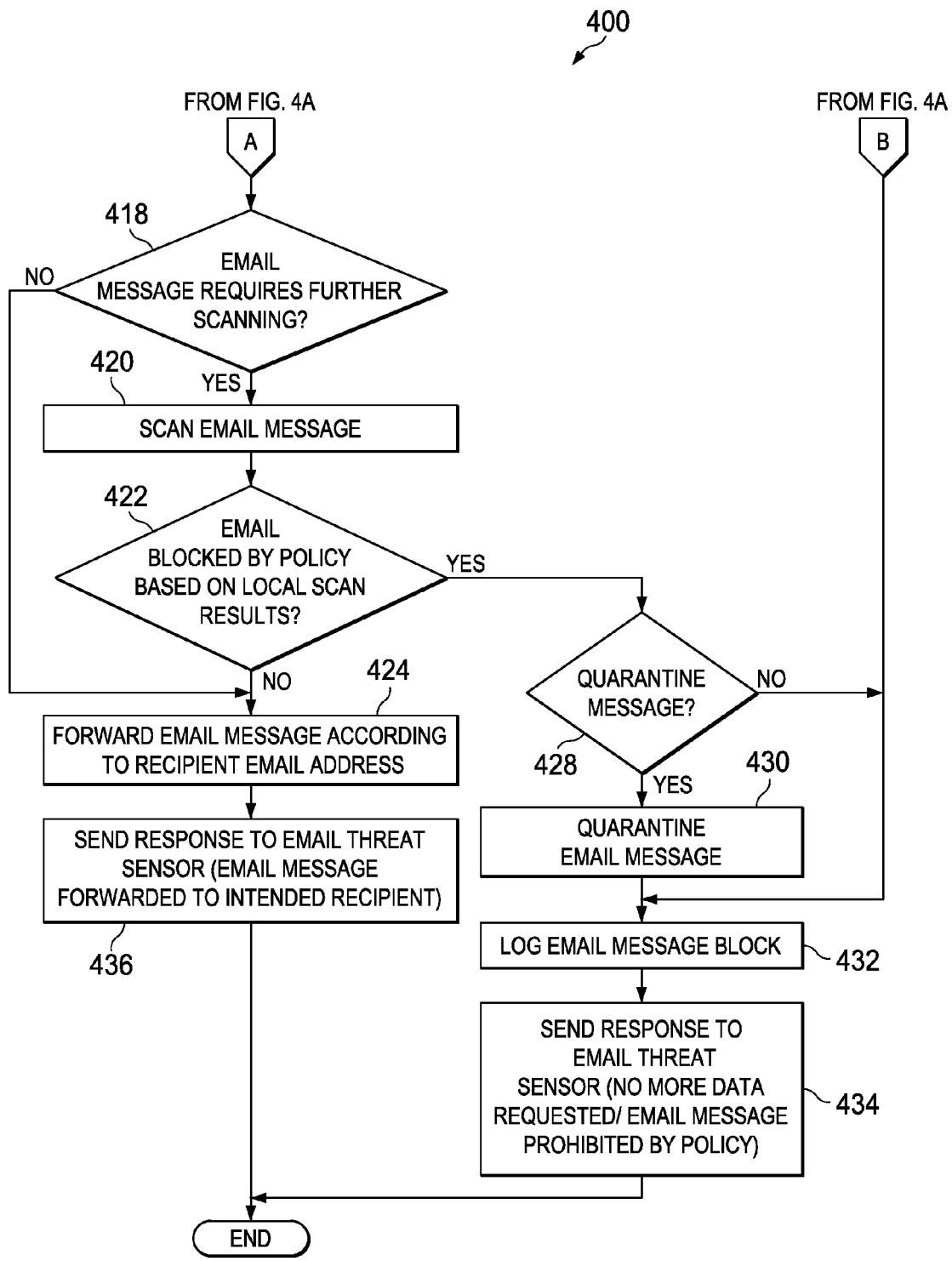

Turning to FIGS. 4A and 4B, an example flowchart illustrates possible operations of a flow 400 that may be associated with email policy device 140. In an embodiment, one or more operations of flow 400 may be performed by inbound email policy module 143 and/or local scanning module 145.

In FIGS. 4A and 4B, flow 400 assumes that a connection has already been established (as detailed in FIGS. 2 and 3) between the email policy device and an email threat sensor that provides threat services in the cloud. At 402, email policy device receives message metadata from the email threat sensor. At 404, the message metadata is evaluated and a determination is made as to whether the email message is prohibited by any metadata policy configurations. If a metadata policy prohibits the email message based on the message metadata (e.g., connection information, protocol information), then an email message block can be logged at 432, for example, in reports/message queues 147. Then at 434, a response can be sent to the email threat sensor indicating that no more data is requested because the email message is blocked.

If none of the metadata policies prohibit the email message based on the message metadata, as determined at 404, then at 406, the email policy device can send a response to the email threat sensor requesting the scan results data associated with the email message. At 408, the email policy device can receive scan results data for the email message from the email threat sensor. The scan results data can include anti-virus scan results and/or anti-spam scan results from scans that were performed on the email message in the email cloud network.

At 410, the scan results data is evaluated and a determination is made as to whether the email message is prohibited by any scan policy configurations. If a scan policy prohibits the email message based on the scan results data, then an email message block can be logged at 432, for example, in reports/message queues 147. Scan policy configurations can be tailored for particular needs of a given network. In some scenarios, all positive cloud scan results (e.g., for viruses or spam) may be prohibited by a scan policy. In other scenarios, however, certain viruses or spam emails may not be prohibited. At 434, a response can be sent to the email threat sensor indicating that no more data is requested because the email message is prohibited by a scan policy from being received in the protected network.

If none of the scan policies prohibit the email message based on the scan results data, as determined at 410, then at 412, the email policy device can send a response to the email threat sensor requesting the email message. At 414, the email policy device can receive the email message from the email threat sensor.

After receiving the email message, at 416 it may be determined whether the email message should be quarantined. In an embodiment of flow 400, policy configurations of the email policy device may require certain email messages that are prohibited by policy based on the message metadata or the cloud scan results data to be quarantined. In this implementation, the email message may be identified and marked as blocked/quarantined in the email policy device (e.g., in quarantined messages 149) during the metadata and scan policy evaluations. Once the email message is received, a search can be performed (e.g., in reports/message queues 147) to determine whether the email message was already determined to be prohibited by policy and marked as needing to be quarantined.

If it is determined, at 416, that the email message was previously marked for quarantining, then at 426, the email message can be quarantined, for example, by storing the message data in quarantined messages 149. The email message can be logged as blocked and/or quarantined) at 432, for example, in reports/message queues 147. At 434, a response can be sent to the email threat sensor indicating that the email message is blocked and/or quarantined and therefore, was not received by the intended recipient.

If it is determined, at 416, that the email message was not previously marked for quarantining, then at 418, it may be determined whether the email message requires further scanning. For example, network specific policies for prohibited content may be configured for inbound email messages that pass the metadata and cloud scan results evaluations. If the email message requires further scanning, then the email message is scanned at 420.

At 422, the local scan results are evaluated and a determination is made as to whether the email message is prohibited by any local scan policy configurations. If at least one local scan policy prohibits the email message based on the local scan results, then at 428, it is determined whether a policy requires the email message to be quarantined. If so, then the email message is quarantined at 430. Whether the email message is quarantined or not, at 432, an email message block can be logged, for example, in reports/message queues 147. Then, at 434, a response can be sent to the email threat sensor indicating that the email message is blocked and/or quarantined and therefore, was not received by the intended recipient.

If none of the local scan policies prohibit the email message based on the local scan results as determined at 422, or if the email message did not require further scanning as determined at 418, then at 424, the email policy device forwards the email message according to the recipient email address in the email message. More specifically, the email policy device can forward the email message to a mail server that is configured to receive the email message in the protected network. The mail server can then deliver the email message to the intended recipient (e.g., an email mailbox). At 436, the email policy device may also send a response to the email threat sensor indicating that the email message was forwarded to the intended recipient.

FIG. 5 illustrates a computing system 500 that is arranged in a point-to-point (PtP) configuration according to an embodiment. In particular, FIG. 5 shows a system where processors, memory, and input/output devices are interconnected by a number of point-to-point interfaces. Generally, one or more of the network elements of communication system 100 may be configured in the same or similar manner as computing system 500. For example, email threat sensor 130 and email policy device 140, shown and described herein, may each be configured in the same or similar manner as exemplary computing system 500, with each of processors 131 and 141 corresponding to processors 574 and/or 584, and with each of memory elements 132 and 142 corresponding to memory elements 532 and/or 534.

As illustrated in FIG. 5, system 500 may include several processors, of which only two, processors 570 and 580, are shown for clarity. While two processors 570 and 580 are shown, it is to be understood that an embodiment of system 500 may also include only one such processor. Processors 570 and 580 may each include a set of cores (i.e., processor cores 574A and 574B and processor cores 584A and 584B) to execute multiple threads of a program. The cores may be configured to execute instruction code in a manner similar to that discussed above with reference to FIGS. 1-4. Each processor 570, 580 may include at least one shared cache 571, 581. Shared caches 571, 581 may store data (e.g., instructions) that are utilized by one or more components of processors 570, 580, such as processor cores 574 and 584.

Processors 570 and 580 may also each include integrated memory controller logic (MC) 572 and 582 to communicate with memory elements 532 and 534. Memory elements 532 and/or 534 may store various data used by processors 570 and 580. In alternative embodiments, memory controller logic 572 and 582 may be discrete logic separate from processors 570 and 580.

Processors 570 and 580 may be any type of processor, such as those discussed with reference to FIG. 1. Processors 570 and 580 may exchange data via a point-to-point (PtP) interface 550 using point-to-point interface circuits 578 and 588, respectively. Processing elements 570 and 580 may each exchange data with a chipset 590 via individual point-to-point interfaces 552 and 554 using point-to-point interface circuits 576, 586, 594, and 598. Chipset 590 may also exchange data with a high-performance graphics circuit 538 via a high-performance graphics interface 539, using an interface circuit 592, which could be a PtP interface circuit. In alternative embodiments, any or all of the PtP links illustrated in FIG. 5 could be implemented as a multi-drop bus rather than a PtP link.

Chipset 590 may be in communication with a bus 520 via an interface circuit 596. Bus 520 may have one or more devices that communicate over it, such as a bus bridge 518 and I/O devices 516. Via a bus 510, bus bridge 518 may be in communication with other devices such as a keyboard/mouse 512 (or other input devices such as a touch screen, trackball, etc.), communication devices 526 (such as modems, network interface devices, or other types of communication devices that may communicate through a computer network 560), audio I/O devices 514, and/or a data storage device 528. Data storage device 528 may store code 530, which may be executed by processors 570 and/or 580. In alternative embodiments, any portions of the bus architectures could be implemented with one or more PtP links.

The computer system depicted in FIG. 5 is a schematic illustration of an embodiment of a computing system that may be utilized to implement various embodiments discussed herein. It will be appreciated that various components of the system depicted in FIG. 5 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, etc. It will be appreciated that these mobile devices may be provided with SoC architectures in at least some embodiments.

Figure 6:
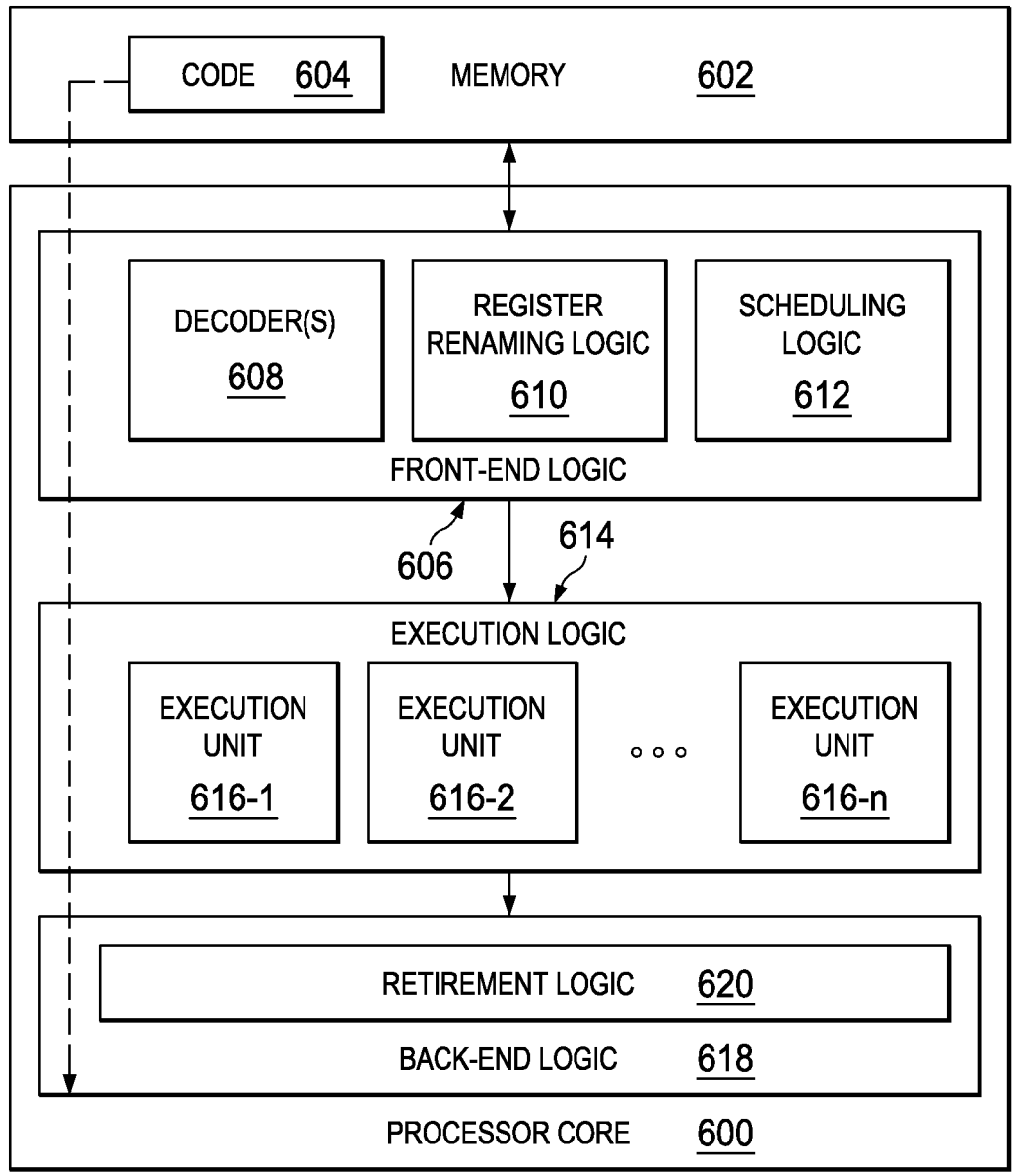
FIG. 6 is a block diagram illustrating an example processor core in accordance with an embodiment.

FIG. 6 illustrates a processor core 600 according to an embodiment. Processor core 600 may be the core for any type of processor, such as a micro-processor, an embedded processor, a digital signal processor (DSP), a network processor, or other device to execute code. Although only one processor core 600 is illustrated in FIG. 6, a processor may alternatively include more than one of the processor core 600 illustrated in FIG. 6. For example, processor core 600 represents one example embodiment of processors cores 574*a*, 574*b*, 584*a*, and 584*b* shown and described with reference to processors 570 and 580 of FIG. 5. Processor core 600 may be a single-threaded core or, for at least one embodiment, processor core 600 may be multithreaded in that it may include more than one hardware thread context (or "logical processor") per core.

FIG. 6 also illustrates a memory 602 coupled to processor core 600 in accordance with an embodiment. Memory 602 may be any of a wide variety of memories (including various layers of memory hierarchy) as are known or otherwise available to those of skill in the art. Memory 602 may include code 604, which may be one or more instructions, to be executed by processor core 600. Processor core 600 can follow a program sequence of instructions indicated by code 604. Each instruction enters a front-end logic 606 and is processed by one or more decoders 608. The decoder may generate, as its output, a micro operation such as a fixed width micro operation in a predefined format, or may generate other instructions, micro-instructions, or control signals that reflect the original code instruction. Front-end logic 606 also includes register renaming logic 610 and scheduling logic 612, which generally allocate resources and queue the operation corresponding to the instruction for execution.

Processor core 600 can also include execution logic 614 having a set of execution units 616-1 through 616-N. Some embodiments may include a number of execution units dedicated to specific functions or sets of functions. Other embodiments may include only one execution unit or one execution unit that can perform a particular function. Execution logic 614 performs the operations specified by code instructions.

After completion of execution of the operations specified by the code instructions, back-end logic 618 can retire the instructions of code 604. In one embodiment, processor core 600 allows out of order execution but requires in order retirement of instructions. Retirement logic 620 may take a variety of known forms (e.g., re-order buffers or the like). In this manner, processor core 600 is transformed during execution of code 604, at least in terms of the output generated by the decoder, hardware registers and tables utilized by register renaming logic 610, and any registers (not shown) modified by execution logic 614.

Although not illustrated in FIG. 6, a processor may include other elements on a chip with processor core 600, at least some of which were shown and described herein with reference to FIG. 5. For example, as shown in FIG. 5, a processor may include memory control logic along with processor core 600. The processor may include I/O control logic and/or may include I/O control logic integrated with memory control logic.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that communication system 100 and its teachings are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

It is also important to note that the operations in the preceding flow diagrams (i.e., FIGS. 2-4) illustrate only some of the possible correlating scenarios and patterns that may be executed by, or within, communication system 100. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although communication system 100 has been illustrated with reference to particular elements and operations that facilitate the communication process, these elements and operations may be replaced by any suitable architecture, protocols, and/or processes that achieve the intended functionality of communication system 100.

The following examples pertain to embodiments in accordance with this Specification. One or more embodiments may provide a method for applying policies to an email message. The method may include: receiving, by an inbound policy module in a protected network, message metadata of an email message; determining, based on the message metadata, whether receiving the email message in the protected network is prohibited by at least one metadata policy of one or more metadata policies; and blocking the email message from being forwarded to the protected network if receiving the email message in the protected network is prohibited by the at least one metadata policy.

In an example of an embodiment, the blocking includes sending a response code to an email threat sensor in a cloud network, where the email threat sensor received the email message from a sending client in another network.

An example of an embodiment further comprises requesting scan results data for the email message if receiving the email message in the protected network is not prohibited by the one or more metadata policies.

An example of an embodiment further comprises receiving, by the inbound policy module in the protected network, the scan results data; determining, based on the scan results data, whether receiving the email message in the protected network is prohibited by at least one scan policy of one or more scan policies; and blocking the email message from being forwarded to the protected network if receiving the email message in the protected network is prohibited by the at least one scan policy.

An example of an embodiment further comprises requesting the email message if receiving the email message in the protected network is not prohibited by the one or more scan policies.

An example of an embodiment further comprises receiving, by the inbound policy module in the protected network, the email message when the email message is requested; and forwarding the email message to a mail server in the protected network, wherein the mail server delivers the email message to an intended recipient of the email message.

An example of an embodiment further comprises receiving, by the inbound policy module in the protected network, the email message when the email message is requested; scanning the received email message for content prohibited by one or more local scan policies; and responsive to finding at least some prohibited content during the scanning, quarantining the email message.

An example of an embodiment further comprises receiving, by the inbound policy module in the protected network, the email message when the email message is requested; scanning the received email message for content prohibited by one or more local scan policies; and responsive to finding at least some prohibited content during the scanning, blocking the email message from being delivered to an intended recipient of the email message.

An example of an embodiment further comprises responsive to not finding any prohibited content during the scanning, forwarding the email message to a mail server in the protected network, wherein the mail server delivers the email message to an intended recipient of the email message.

One or more embodiments provide at least one machine readable storage medium having instructions stored thereon for applying policies to an email message, the instructions when executed by a processor cause the processor to: receive, by an inbound policy module in a protected network, message metadata of an email message; determine, based on the message metadata, whether receiving the email message in the protected network is prohibited by at least one metadata policy of one or more metadata policies; and block the email message from being forwarded to the protected network if receiving the email message in the protected network is prohibited by the at least one metadata policy. An example of an embodiment further comprises instructions that when executed by the processor, cause the processor to send a response code to an email threat sensor in a cloud network to block the email message from being forwarded to the protected network, wherein the email threat sensor received the email message from a sending client in another network.

An example of an embodiment further comprises instructions that when executed by the processor, cause the processor to request scan results data for the email message if receiving the email message in the protected network is not prohibited by the one or more metadata policies.

An example of an embodiment further comprises instructions that when executed by the processor, cause the processor to receive, by the inbound policy module in the protected network, the scan results data; determine, based on the scan results data, whether receiving the email message in the protected network is prohibited by at least one scan policy of one or more scan policies; and block the email message from being forwarded to the protected network if receiving the email message in the protected network is prohibited by the at least one scan policy.

An example of an embodiment further comprises instructions that when executed by the processor, cause the processor to request the email message if receiving the email message in the protected network is not prohibited by the one or more scan policies.

An example of an embodiment further comprises instructions that when executed by the processor, cause the processor to receive, by the inbound policy module in the protected network, the email message when the email message is requested; and forward the email message to a mail server in the protected network, wherein the mail server delivers the email message to an intended recipient of the email message.

An example of an embodiment further comprises instructions that when executed by the processor, cause the processor to receive, by the inbound policy module in the protected network, the email message when the email message is requested; scan the received email message for content prohibited by one or more local scan policies; and responsive to finding at least some prohibited content when the email message is scanned, quarantine the email message.

An example of an embodiment further comprises instructions that when executed by the processor, cause the processor to receive, by the inbound policy module in the protected network, the email message when the email message is requested; scan the received email message for content prohibited by one or more local scan policies; and responsive to finding at least some prohibited content during the scanning, block the email message from being delivered to an intended recipient of the email message.

An example of an embodiment further comprises instructions that when executed by the processor, cause the processor to responsive to not finding any prohibited content during the scanning, forward the email message to a mail server in the protected network, wherein the mail server is configured to deliver the email message to an intended recipient of the email message.

One or more embodiments include an apparatus for applying policies to an email message, the apparatus comprising a processor in a protected network; and an inbound policy module executing on the processor, the inbound policy module configured to: receive message metadata of an email message; determine, based on the message metadata, whether receiving the email message in the protected network is prohibited by at least one metadata policy of one or more metadata policies; and block the email message from being forwarded to the protected network if receiving the email message in the protected network is prohibited by the at least one metadata policy.

An example of an embodiment further comprises, the inbound policy module being configured to: send a response code to an email threat sensor in a cloud network to block the email message from being forwarded to the protected network, wherein the email threat sensor received the email message from a sending client in another network.

An example of an embodiment further comprises, the inbound policy module being configured to: request scan results data for the email message if receiving the email message in the protected network is not prohibited by the one or more metadata policies.

An example of an embodiment further comprises, the inbound policy module being configured to: receive the scan results data; determine, based on the scan results data, whether receiving the email message in the protected network is prohibited by at least one scan policy of one or more scan policies; and block the email message from being forwarded to the protected network if receiving the email message in the protected network is prohibited by the at least one scan policy.

An example of an embodiment further comprises, the inbound policy module being configured to: request the email message if receiving the email message in the protected network is not prohibited by the one or more scan policies.

An example of an embodiment further comprises, the inbound policy module being configured to: receive the email message when the email message is requested; and forward the email message to a mail server in the protected network, wherein the mail server delivers the email message to an intended recipient of the email message.

An example of an embodiment further comprises, the inbound policy module being configured to: receive the email message when the email message is requested; scan the received email message for content prohibited by a local scan policy; and responsive to finding at least some prohibited content during the scanning, quarantine the email message.

An example of an embodiment further comprises, the inbound policy module being configured to: receive the email message when the email message is requested; scan the received email message for content prohibited by a local scan policy; and responsive to finding at least some prohibited content during the scanning, block the email message from being delivered to an intended recipient of the email message.

An example of an embodiment further comprises, the inbound policy module being configured to: responsive to not finding any prohibited content during the scan, forward the email message to a mail server in the protected network, wherein the mail server is configured to deliver the email message to an intended recipient of the email message.

One or more embodiments provide at least one machine readable storage medium having instructions stored thereon for applying policies to an email message, the instructions when executed by a processor cause the processor to: receive an email message with a recipient email address, the recipient email address identifying an intended recipient in a protected network; send message metadata of the email message to an inbound email policy module in the protected network; and prevent the email message from being forwarded to the protected network if receiving the email message in the protected network is prohibited by at least one metadata policy of one or more metadata policies.

An example of an embodiment further comprises instructions that when executed on the processor, cause the processor to: scan the email message for one or more threats; and send scan results data to the inbound email policy module in the protected network if receiving the email message in the protected network is not prohibited by the one or more metadata policies.

An example of an embodiment further comprises instructions, when executed on the machine, cause the machine to: send the email message to the inbound email policy module in the protected network if receiving the email message in the protected network is not prohibited by the one or more scan policies.

One particular example implementation may include means for receiving, in a protected network, message metadata of an email message; means for determining, based on the message metadata, whether receiving the email message in the protected network is prohibited by at least one metadata policy of one or more metadata policies; and means for blocking the email message from being forwarded to the protected network if receiving the email message in the protected network is prohibited by the at least one metadata policy. In addition, the implementation may include means for requesting scan results data for the email message if receiving the email message in the protected network is not prohibited by the one or more metadata policies. The implementation may further include means for receiving, in the protected network, the scan results data; means for determining, based on the scan results data, whether receiving the email message in the protected network is prohibited by at least one scan policy of one or more scan policies; and means for blocking the email message from being forwarded to the protected network if receiving the email message in the protected network is prohibited by the at least one scan policy. The implementation may also include means for requesting the email message if receiving the email message in the protected network is not prohibited by the one or more scan policies. Additionally, the implementation may include means for receiving, in the protected network, the email message when the email message is requested; means for scanning the received email message for content prohibited by one or more local scan policies; and responsive to finding at least some prohibited content during the scanning, means for quarantining or blocking the email message.

Another example implementation may include means for receiving an email message with a recipient email address, the recipient email address identifying an intended recipient in a protected network; means for sending message metadata of the email message to an inbound email policy module in the protected network; and means for preventing the email message from being forwarded to the protected network if receiving the email message in the protected network is prohibited by at least one metadata policy of one or more metadata policies. The implementation may also include means for scanning the email message for one or more threats; means for sending scan results data to the inbound email policy module in the protected network if receiving the email message in the protected network is not prohibited by the one or more metadata policies. In addition, the implementation may include sending the email message to the inbound email policy module in the protected network if receiving the email message in the protected network is not prohibited by the one or more scan policies.

What is claimed is:

1. A method for applying policies to an email message, comprising:
   receiving, by an inbound policy module in a protected network, message metadata of an email message en route to an intended recipient associated with the protected network, wherein the message metadata is to be received without the email message;
   determining, based on the message metadata, whether receiving the email message in the protected network is prohibited by at least one metadata policy of one or more metadata policies;
   sending a response from the protected network to block the email message from being forwarded to the protected network if receiving the email message in the protected network is determined to be prohibited by the at least one metadata policy;

sending a request from the protected network for scan results data for the email message if receiving the email message in the protected network is determined not to be prohibited by the one or more metadata policies;
receiving, by the inbound policy module in the protected network, the scan results data;
determining, based on the scan results data, whether receiving the email message in the protected network is prohibited by at least one scan policy of one or more scan policies;
sending a particular response from the protected network to block the email message from being forwarded to the protected network if receiving the email message in the protected network is prohibited by the at least one scan policy;
sending a request from the protected network for the email message if receiving the email message in the protected network is not prohibited by the one or more scan policies;
receiving, by the inbound policy module in the protected network, the email message in response to the request for the email message; and
forwarding the email message to a destination network address associated with a recipient email address, wherein the destination network address is in the protected network.

2. The method of claim 1, wherein the response is sent to an email threat sensor in a cloud network, wherein the email threat sensor received the email message from a sending client in another network.

3. The method of claim 1, further comprising:
scanning the received email message for content prohibited by one or more local scan policies; and
responsive to finding at least some prohibited content during the scanning, quarantining the email message.

4. The method of claim 1, further comprising:
scanning the received email message for content prohibited by one or more local scan policies; and
responsive to finding at least some prohibited content during the scanning, blocking the email message from being delivered to the intended recipient of the email message.

5. The method of claim 1, further comprising:
scanning the received email message for content prohibited by one or more local scan policies; and
responsive to not finding any prohibited content during the scanning, forwarding the email message to a mail server in the protected network, wherein the mail server delivers the email message to the intended recipient of the email message.

6. At least one non-transitory machine readable storage medium having instructions stored thereon for applying policies to an email message, the instructions when executed by a processor cause the processor to:
receive, by an inbound policy module in a protected network, message metadata of an email message en route to an intended recipient associated with the protected network, wherein the message metadata is to be received without the email message;
determine, based on the message metadata, whether receiving the email message in the protected network is prohibited by at least one metadata policy of one or more metadata policies;
send a response from the protected network to block the email message from being forwarded to the protected network if receiving the email message in the protected network is determined to be prohibited by the at least one metadata policy;
send a request from the protected network for scan results data for the email message if receiving the email message in the protected network is determined not to be prohibited by the one or more metadata policies;
receive, by the inbound policy module in the protected network, the scan results data;
determine, based on the scan results data, whether receiving the email message in the protected network is prohibited by at least one scan policy of one or more scan policies;
send a particular response from the protected network to block the email message from being forwarded to the protected network if receiving the email message in the protected network is prohibited by the at least one scan policy;
send a request from the protected network for the email message if receiving the email message in the protected network is not prohibited by the one or more scan policies;
receive, by the inbound policy module in the protected network, the email message in response to the request for the email message; and
forward the email message to a mail server in the protected network, wherein the mail server delivers the email message to the intended recipient of the email message.

7. The at least one non-transitory machine readable storage medium of claim 6, wherein the response is to be sent to an email threat sensor in a cloud network, wherein the email threat sensor is to receive the email message from a sending client in another network.

8. At least one non-transitory machine readable storage medium having instructions stored thereon for applying policies to an email message, the instructions when executed by a processor cause the processor to:
receive, by an inbound policy module in a protected network, message metadata of an email message en route to an intended recipient associated with the protected network, wherein the message metadata is to be received without the email message;
determine, based on the message metadata, whether receiving the email message in the protected network is prohibited by at least one metadata policy of one or more metadata policies;
send a response from the protected network to block the email message from being forwarded to the protected network if receiving the email message in the protected network is determined to be prohibited by the at least one metadata policy;
send a request from the protected network for scan results data for the email message if receiving the email message in the protected network is determined not to be prohibited by the one or more metadata policies;
receive, by the inbound policy module in the protected network, the scan results data;
determine, based on the scan results data, whether receiving the email message in the protected network is prohibited by at least one scan policy of one or more scan policies;
send a particular response from the protected network to block the email message from being forwarded to the protected network if receiving the email message in the protected network is prohibited by the at least one scan policy;
send a request from the protected network for the email message if receiving the email message in the protected network is not prohibited by the one or more scan policies;

receive, by the inbound policy module in the protected network, the email message in response to the request for the email message;

scan the received email message for content prohibited by one or more local scan policies; and responsive to finding at least some prohibited content during the scanning, quarantine the email message.

9. At least one non-transitory machine readable storage medium having instructions stored thereon for applying policies to an email message, the instructions when executed by a processor cause the processor to:

receive, by an inbound policy module in a protected network, message metadata of an email message en route to an intended recipient associated with the protected network, wherein the message metadata is to be received without the email message;

determine, based on the message metadata, whether receiving the email message in the protected network is prohibited by at least one metadata policy of one or more metadata policies;

send a response from the protected network to block the email message from being forwarded to the protected network if receiving the email message in the protected network is determined to be prohibited by the at least one metadata policy;

send a request from the protected network for scan results data for the email message if receiving the email message in the protected network is determined not to be prohibited by the one or more metadata policies;

receive, by the inbound policy module in the protected network, the scan results data;

determine, based on the scan results data, whether receiving the email message in the protected network is prohibited by at least one scan policy of one or more scan policies;

send a particular response from the protected network to block the email message from being forwarded to the protected network if receiving the email message in the protected network is prohibited by the at least one scan policy;

send a request from the protected network for the email message if receiving the email message in the protected network is not prohibited by the one or more scan policies;

receive, by the inbound policy module in the protected network, the email message in response to the request for the email message;

scan the received email message for content prohibited by one or more local scan policies; and responsive to finding at least some prohibited content during the scanning, block the email message from being delivered to the intended recipient of the email message.

10. At least one non-transitory machine readable storage medium having instructions stored thereon for applying policies to an email message, the instructions when executed by a processor cause the processor to:

receive, by an inbound policy module in a protected network, message metadata of an email message en route to an intended recipient associated with the protected network, wherein the message metadata is to be received without the email message;

determine, based on the message metadata, whether receiving the email message in the protected network is prohibited by at least one metadata policy of one or more metadata policies;

send a response from the protected network to block the email message from being forwarded to the protected network if receiving the email message in the protected network is determined to be prohibited by the at least one metadata policy;

send a request from the protected network for scan results data for the email message if receiving the email message in the protected network is determined not to be prohibited by the one or more metadata policies;

receive, by the inbound policy module in the protected network, the scan results data;

determine, based on the scan results data, whether receiving the email message in the protected network is prohibited by at least one scan policy of one or more scan policies;

send a particular response from the protected network to block the email message from being forwarded to the protected network if receiving the email message in the protected network is prohibited by the at least one scan policy;

send a request from the protected network for the email message if receiving the email message in the protected network is not prohibited by the one or more scan policies;

receive the email message in response to the request for the email message;

scan the received email message for content prohibited by a local scan policy; and responsive to not finding any prohibited content during the scanning, forward the email message to a mail server in the protected network, wherein the mail server is configured to deliver the email message to the intended recipient of the email message.

11. An apparatus for applying policies to an email message, comprising:

a processor in a protected network; and an inbound policy module executing on the processor, the inbound policy module configured to:

receive message metadata of an email message en route to an intended recipient associated with the protected network, wherein the message metadata is to be received without the email message;

determine, based on the message metadata, whether receiving the email message in the protected network is prohibited by at least one metadata policy of one or more metadata policies;

send a response from the protected network to block the email message from being forwarded to the protected network if receiving the email message in the protected network is determined to be prohibited by the at least one metadata policy;

send a request from the protected network for scan results data for the email message if receiving the email message in the protected network is determined not to be prohibited by the one or more metadata policies;

receive the scan results data;

determine, based on the scan results data, whether receiving the email message in the protected network is prohibited by at least one scan policy of one or more scan policies;

send a particular response from the protected network to block the email message from being forwarded to the protected network if receiving the email message in the protected network is prohibited by the at least one scan policy;

send a request from the protected network for the email message if receiving the email message in the protected network is not prohibited by the one or more scan policies;

receive the email message in response to the request for the email message; and forward the email message to a mail server in the protected network, wherein the mail server delivers the email message to the intended recipient of the email message.

12. The apparatus of claim 11, wherein the response is to be sent to an email threat sensor in a cloud network, wherein the email threat sensor is to receive the email message from a sending client in another network.

13. The apparatus of claim 11, wherein the inbound policy module is further configured to:

scan the received email message for content prohibited by a local scan policy; and responsive to finding at least some prohibited content when the email message is scanned, quarantine the email message.

14. The apparatus of claim 11, wherein the inbound policy module is further configured to:

scan the received email message for content prohibited by a local scan policy; and responsive to finding at least some prohibited content during the scanning, block the email message from being delivered to the intended recipient of the email message.

15. The apparatus of claim 11, wherein the inbound policy module is further configured to:

scan the received email message for content prohibited by a local scan policy; and responsive to not finding any prohibited content during the scan, forward the email message to the mail server in the protected network.

* * * * *